US012603197B2

(12) United States Patent (10) Patent No.: US 12,603,197 B2
Millet et al. (45) Date of Patent: Apr. 14, 2026

(54) ELECTRIC CABLE EQUIPPED WITH AT LEAST ONE SPACER, AIRCRAFT COMPRISING AT LEAST ONE SUCH ELECTRIC CABLE

(71) Applicant: Airbus Operations SAS, Toulouse (FR)

(72) Inventors: Gérard Millet, Toulouse (FR); Vincent Delpy, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 206 days.

(21) Appl. No.: 18/603,658

(22) Filed: Mar. 13, 2024

(65) Prior Publication Data

US 2024/0312676 A1 Sep. 19, 2024

(30) Foreign Application Priority Data

Mar. 15, 2023 (FR) ...................................... 2302396

(51) Int. Cl.
 *H01B 17/58* (2006.01)
 *B60R 16/02* (2006.01)
(52) U.S. Cl.
 CPC ......... *H01B 17/58* (2013.01); *B60R 16/0215* (2013.01)
(58) Field of Classification Search
 CPC ...... H02G 3/0475; H02G 3/0468; H02G 3/34; H02G 3/06; H02G 3/0431; H02G 3/04; H02G 3/0487; H02G 3/0481; H02G 3/28; H02G 3/263; H02G 11/00; H02G 11/006;

H01B 17/04; H01B 17/58; H01B 7/24; F16L 3/015; G02B 6/4461; Y10T 403/32; F16G 13/16; B29C 33/34; B29C 33/36; B60R 16/0215
See application file for complete search history.

(56) References Cited

U.S. PATENT DOCUMENTS

| | | | | |
|---|---|---|---|---|
| 3,619,474 | A | * | 11/1971 | Beck ...................... H01B 12/14 |
| | | | | 174/29 |
| 6,974,912 | B2 | * | 12/2005 | Selby ........................ H01B 7/02 |
| | | | | 174/111 |
| 2003/0222183 | A1 | | 12/2003 | Kato |
| 2021/0276498 | A1 | | 9/2021 | Arnesson |
| 2022/0063525 | A1 | | 3/2022 | Millet et al. |

FOREIGN PATENT DOCUMENTS

| | | | |
|---|---|---|---|
| EP | | 3965242 A1 | 3/2022 |
| WO | | 2008102464 A1 | 8/2008 |

OTHER PUBLICATIONS

French Search Report for corresponding French Patent Application No. 2302396 dated Oct. 12, 2023.

* cited by examiner

*Primary Examiner* — Roshn K Varghese
(74) *Attorney, Agent, or Firm* — Greer Burns & Crain Ltd.

(57) ABSTRACT

An electric cable configured to be mounted in an aircraft. This electric cable includes at least one spacer at least partially surrounding a part of the electric cable and making it possible to hold it at a distance greater than a minimum segregation distance from any other element. According to one configuration, the electric cable comprises several spacers distributed along the electric cable and separated from one another.

12 Claims, 4 Drawing Sheets

Fig. 5
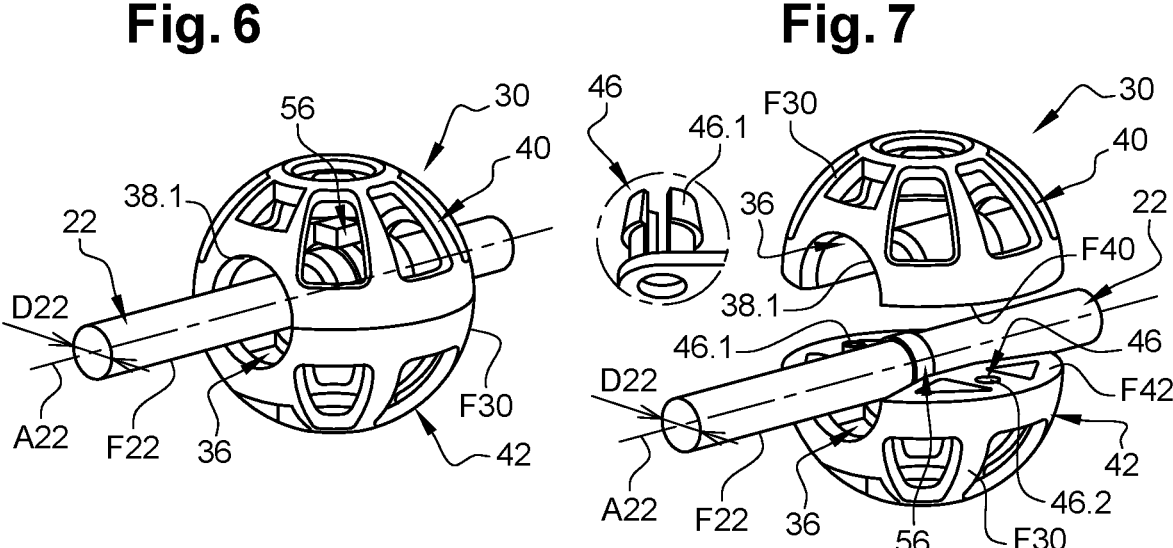
Fig. 6          Fig. 7
Fig. 8          Fig. 9
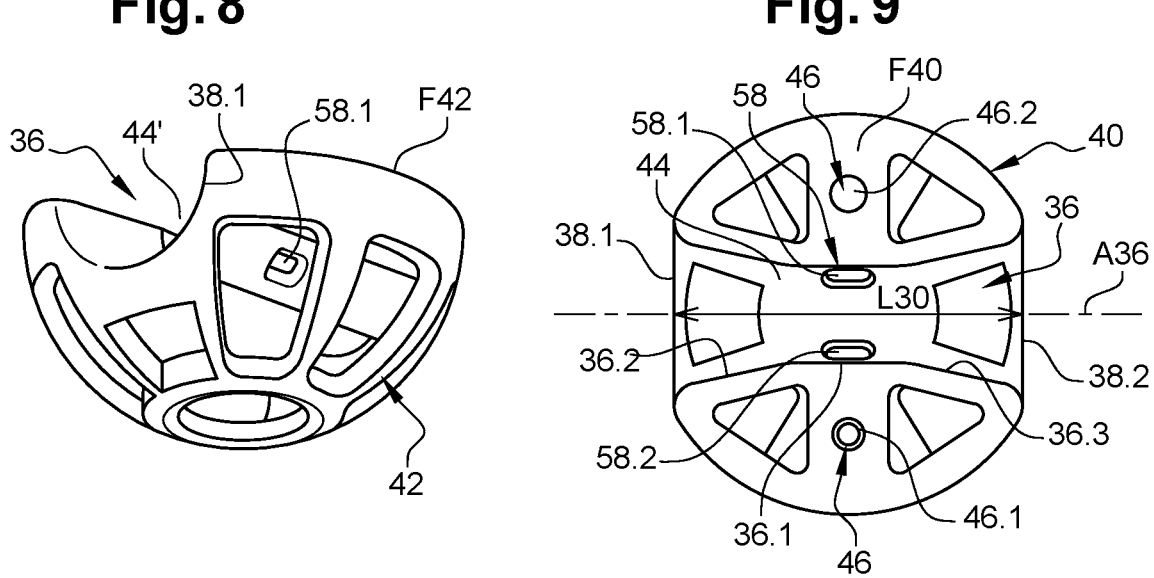

1

ELECTRIC CABLE EQUIPPED WITH AT LEAST ONE SPACER, AIRCRAFT COMPRISING AT LEAST ONE SUCH ELECTRIC CABLE

CROSS-REFERENCES TO RELATED APPLICATIONS

This application claims the benefit of the French patent application No. 2302396 filed on Mar. 15, 2023, the entire disclosures of which are incorporated herein by way of reference.

FIELD OF THE INVENTION

The present application relates to an electric cable equipped with at least one spacer and to an aircraft comprising at least one such electric cable.

For the present application, an electric cable is understood to mean both a single electric cable and several electric cables attached to one another and forming a bundle of electric cables.

BACKGROUND OF THE INVENTION

In an aircraft, an electric cable follows a predetermined path in order to be separated by a minimum distance from other elements of the aircraft, such as its structure, for example. To this end, the electric cable is linked to the structure of the aircraft by ties which are configured to maintain a minimum segregation distance between the electric cable and the structure, the ties being arranged in such a way that the electric cable follows the predetermined path.

According to an embodiment of the prior art visible in FIGS. 1 and 2, an equipment item 10 and an electric cable 12 linked to the equipment item 10 are positioned in a duct 14. According to one configuration, the equipment item 10 is movable between a dismantled position, visible in FIG. 1, in which it is positioned outside the duct 14 and a mounted position, visible in FIG. 2, in which it is positioned inside the duct 14 and linked thereto. To this end, the duct 14 comprises an opening 14.1 configured to allow the passage of the equipment item 10 and a cap 14.2 configured to close the opening 14.1.

The electric cable 12 comprises a first section 12.1 linked to the duct 14 by ties 16 and a second section 12.2 linking the first section 12.1 and the equipment item 10. By virtue of the ties 16, the first section 12.1 is spaced apart from the duct 14 and follows a given path. To allow the equipment item 10 to pass from the dismantled position to the mounted position, the second section 12.2 has an excess length when the equipment item 10 is in mounted position. Because of this excess length, the electric cable 12 can be in contact at contact points 18 with the duct 14, as illustrated in FIG. 2, or have at least one fold. Consequently, this embodiment is not satisfactory because the second section 12.2 of the electric cable 12 cannot observe the principles of segregation.

The present invention aims to remedy all or some of the drawbacks of the prior art.

SUMMARY OF THE INVENTION

To this end, a subject of the invention is an electric cable configured to be mounted in an aircraft, observing a minimum segregation distance, the electric cable comprising a cylindrical outer surface which has, at a given point, an axis of revolution and a diameter.

According to the invention, the electric cable comprises several spacers distributed along the electric cable, each spacer having a length and at least partially surrounding a first part of the electric cable and having an outer surface, the spacers being spaced apart by an interval of between 0.5 and 1 times the length, each spacer being configured such that, when the outer surface is in contact with an element distinct from the electric cable or a second part of the electric cable at a distance from the first part, the latter is separated from the distinct element or from the second part by a distance greater than the minimum segregation distance.

This solution makes it possible to observe the principles of segregation.

According to another feature, the outer surface of the spacer is approximately spherical.

According to another feature, the spacer comprises a duct, configured to house the electric cable, which has an axis of revolution that coincides with a diameter of the spherical outer surface.

According to another feature, the duct has first and second ends that are flared and a cylindrical central section of a diameter substantially equal to that of the electric cable.

According to another feature, the duct has first and second ends each comprising a rounded or chamfered edge linking the duct and the outer surface.

According to another feature, the spacer comprises first and second hemispherical parts respectively comprising first and second contact faces, each of them having a semicylindrical recess corresponding to a half of the duct, the spacer being configured to occupy an assembled state in which the first and second contact faces are in contact with one another and a disassembled state in which the first and second contact faces are separated to allow the electric cable to be put in place in the duct.

According to another feature, the spacer comprises at least one holding system for holding the first and second parts in the assembled state.

According to another feature, the spacer comprises first and second openwork parts and first and second hemispherical shells respectively covering the first and second parts.

According to another feature, the spacer is produced in a single piece and comprises a slit linking the duct and the outer surface to allow the electric cable to be introduced into the duct.

According to another feature, the slit is delimited by lateral faces extending from the duct to the outer surface, said lateral faces being spaced apart by a distance slightly smaller than the diameter of the electric cable.

According to another feature, the spacer is immobilized with respect to the electric cable in a longitudinal direction parallel to the axis of revolution of the electric cable.

Also, a subject of the invention is an aircraft comprising at least one electric cable according to one of the preceding features.

BRIEF DESCRIPTION OF THE DRAWINGS

Other features and advantages will emerge from the following description of the invention, a description given purely by way of example, in light of the attached drawings in which:

FIG. 5 is a schematic cross section of an electric cable equipped with spacers illustrating an embodiment of the invention, FIG. 6 is a perspective view of an electric cable and of a spacer illustrating an embodiment of the invention, FIG. 7 is a perspective view of the electric cable and of the spacer visible in FIG. 6, the spacer being in the disassembled state, FIG. 8 is a perspective view of a half of the spacer visible in FIG. 6, FIG. 9 is a front view of the half of the spacer visible in FIG. 8.

DETAILED DESCRIPTION OF THE PREFERRED EMBODIMENTS

Figure 1:
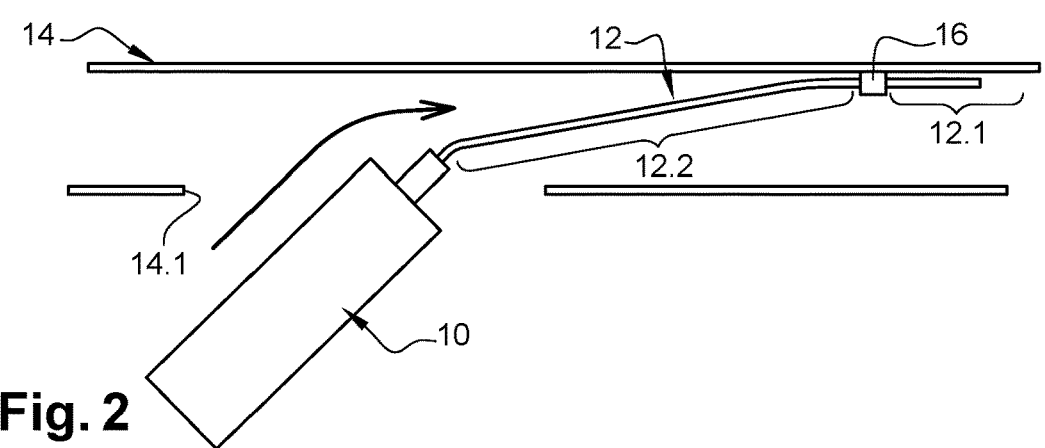
FIG. 1 is a schematic representation of an equipment item and of an electric cable illustrating an embodiment of the prior art, the equipment item being in dismantled position.
Figure 2:
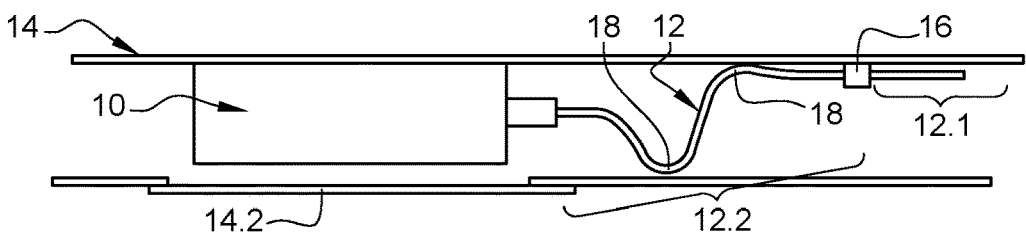
FIG. 2 is a schematic representation of the equipment item and of the electric cable that are visible in FIG. 1, the equipment item being in mounted position.
Figure 3:
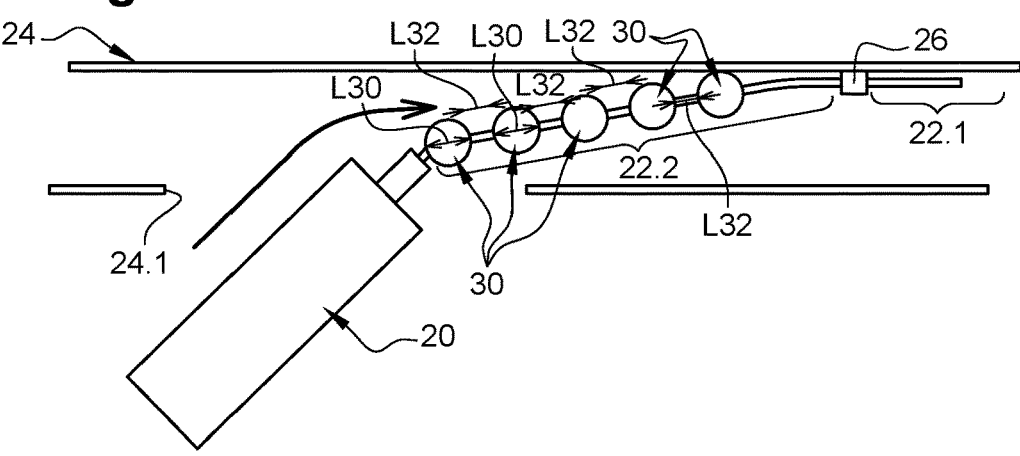
FIG. 3 is a schematic representation of an equipment item and of an electric cable equipped with spacers illustrating an embodiment of the invention, the equipment item being in dismantled position.
Figure 4:
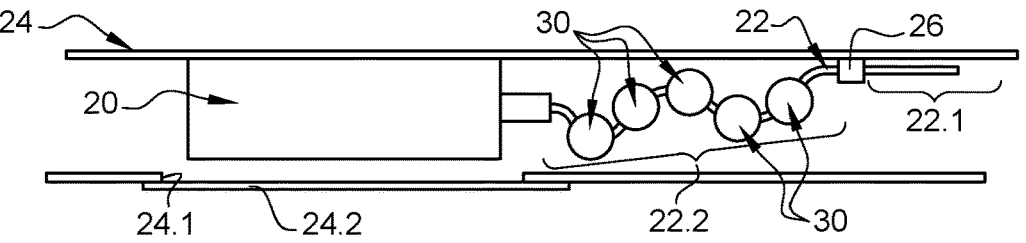
FIG. 4 is a schematic representation of the equipment item and of the electric cable equipped with spacers that are visible in FIG. 3, the equipment item being in mounted position.

According to an embodiment visible in FIGS. 3 and 4, an equipment item 20 and an electric cable 22 linked to the equipment item 20 are positioned in a duct 24. According to one configuration, the equipment item 20 is movable between a dismantled position, visible in FIG. 3, in which it is positioned outside of the duct 24 and a mounted position, visible in FIG. 4, in which it is positioned inside the duct 24 and linked thereto. To this end, the duct 24 comprises an opening 24.1 configured to allow the passage of the equipment item 20 and a cap 24.2 configured to close the opening 24.1.

The electric cable 22 comprises a first section 22.1 linked to the duct 24 by ties 26 and a second section 22.2 linking the first section 22.1 and the equipment item 20. By virtue of the ties 26, the first section 22.1 is spaced apart from the duct 24 and follows a given path. To allow the equipment item 20 to pass from the dismantled position to the mounted position, the second section 22.2 has an excess length when the equipment item 20 is in mounted position.

Obviously, the invention is not limited to this construction. It can be applied to any section of an electric cable 22 positioned in an aircraft, notably to a section which is not held by ties 16.

In order to observe the principles of segregation, the electric cable 22 must be held spaced apart, at any point, by at least a minimum segregation distance from another element, like the duct 24 or a structure of the aircraft, for example. Furthermore, two spaced-apart parts of the electric cable 22 must be held spaced apart from one another by at least the minimum segregation distance.

The electric cable 22 comprises a cylindrical outer surface F22 which has, at a given point, an axis of revolution A22, a diameter D22 and a transverse plane at right angles to the axis of revolution A22. A longitudinal direction corresponds to a direction parallel to the axis of revolution A22.

The electric cable 22 comprises at least one spacer 30 at least partially surrounding a first part 28 of the electric cable 22 and having an outer surface F30, the spacer 30 being configured such that, when the outer surface F30 is in contact with an element distinct from the electric cable 22 or a second part of the electric cable 22 at a distance from the first part 28, the latter is separated from the distinct element or from the second part by a distance greater than the minimum segregation distance. Each spacer 30 has a length L30 (visible in FIG. 9) corresponding to its dimension taken in the longitudinal direction when the spacer 30 is positioned on the electric cable 22.

According to one construction, the electric cable 22 comprises several spacers 30 distributed along the electric cable 22 and separated from one another so as to allow the electric cable 22 to follow a curved path. The spacers 30 all have the same length L30. The spacers 30 are spaced apart by an interval L32 of between 0.5 and 1 times the length L30 of the spacers. This construction allows the electric cable 22 to follow a curved path, by limiting any contact of the electric cable 22 with another element or itself.

According to one configuration, the outer surface F30 of each spacer 30 is approximately spherical. In addition, the spacer 30 has a duct 36, configured to house the electric cable, which has an axis of revolution A36 that coincides with a diameter of the spherical outer surface F30.

According to one configuration, the duct 36 has first and second ends 38.1, 38.2 that are flared. This configuration allows the electric cable 22 to follow a curved path. According to one construction, the duct 36 comprises a cylindrical central section 36.1, of a diameter substantially equal to that of the electric cable 22 and, on either side of the central section 36.1, tapered sections 36.2, 36.3 that flare away from the central section 36.1. Thus, the spacer 30 is immobilized in a transverse plane with respect to the electric cable 22 at the central section 36.1.

To limit the risks of damaging the electric cable 22, the ends 38.1, 38.2 each have a rounded or chamfered edge linking the duct 36 and the outer surface F30.

According to embodiments visible in FIGS. 5 to 12, each spacer 30 comprises first and second hemispherical parts 40, 42 respectively comprising first and second contact faces F40, F42, each of them comprising a semicylindrical recess 44, 44' corresponding to a half of the duct 36. Thus, each spacer 30 is configured to occupy an assembled state, as illustrated in FIG. 6, in which the first and second contact faces F40, F42 are in contact with one another and the electric cable 22 positioned in the duct 36, and a disassembled state, as illustrated in FIG. 7, in which the first and second contact faces F40, F42 are separated to allow the electric cable 22 to be put in place in the duct 36.

During assembly, the first part 40 is linked to the electric cable 22 by a clamping collar. Next, the second part 42 is added onto the first part 40 so as to form the duct 36.

Once the electric cable 22 is positioned in the duct 36, the spacer 30 is held in the assembled state by gluing, by welding or by at least one system 46 for holding in the assembled state.

According to an embodiment visible in FIGS. 7 and 9, the holding system 46 comprises at least one pin 46.1 secured to the first contact face F40 and, for each pin 46.1, a hole 46.2 provided at the second contact face F42, the pin 46.1 and the hole 46.2 being configured such that the pin 46.1 can be force-fitted into the hole 46.2 and remain wedged therein. According to one construction, the spacer 30 comprises a first pin 46.1, secured to the first contact face F40, configured to be fitted into a hole provided on the second contact face F42 and a second pin 46.1', secured to the second contact face F42, configured to be fitted into a hole provided on the first contact face F40, the first and second pins 46.1, 46.1' being positioned on either side of the duct 36. Obviously, the invention is not limited to this holding system 46. As an example, the holding system 46 could be a clamping collar.

Figures 10, 11, 12:
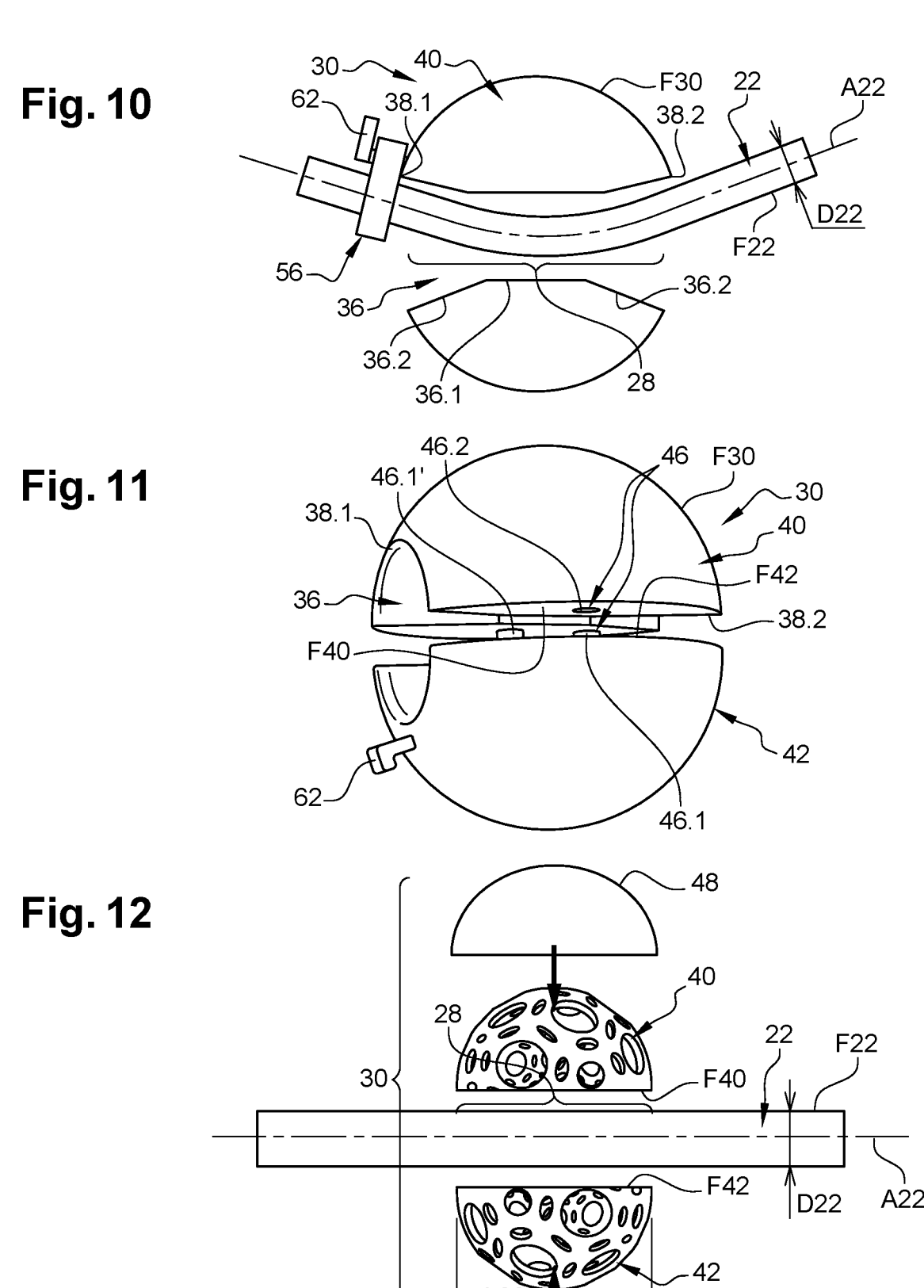
FIG. 10 is a schematic cross section of an electric cable equipped with a spacer illustrating another embodiment of the invention.
FIG. 11 is a perspective view of the spacer visible in FIG. 10 in the disassembled state.
FIG. 12 is a lateral view of an electric cable and of a spacer in the disassembled state illustrating another embodiment of the invention.

According to an embodiment visible in FIG. 11, the spacer 30 is solid. It can be produced in a rigid or semi-rigid material such as a foam for example.

According to embodiments visible in FIGS. 6 to 9 and 12, each spacer 30 is largely openwork. It can be produced in a rigid or semi-rigid material such as a foam for example.

According to an embodiment visible in FIG. 12, each spacer 30 comprises first and second openwork parts 40, 42 and first and second hemispherical shells 48, 50, without orifices, respectively covering the first and second parts 40, 42. These first and second shells 48, 50 make it possible to prevent the largely openwork spacer 30 from being caught on an element and limiting the movements of the electric cable 22. According to one configuration, the first and second shells 48, 50 are produced in a material that exhibits a low coefficient of friction. This solution favors the slipping of the spacer 30 in order to reduce the risks of limiting the movements of the electric cable 22.

Figure 13:
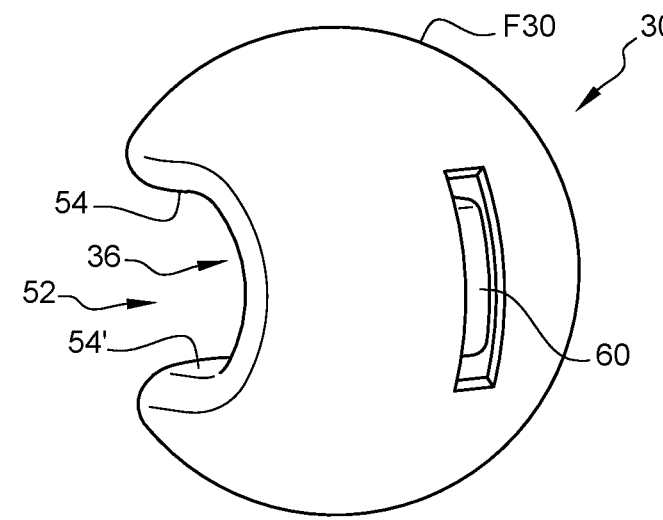
FIG. 13 is a perspective view from a first viewing angle of a spacer illustrating another embodiment of the invention.
Figure 14:
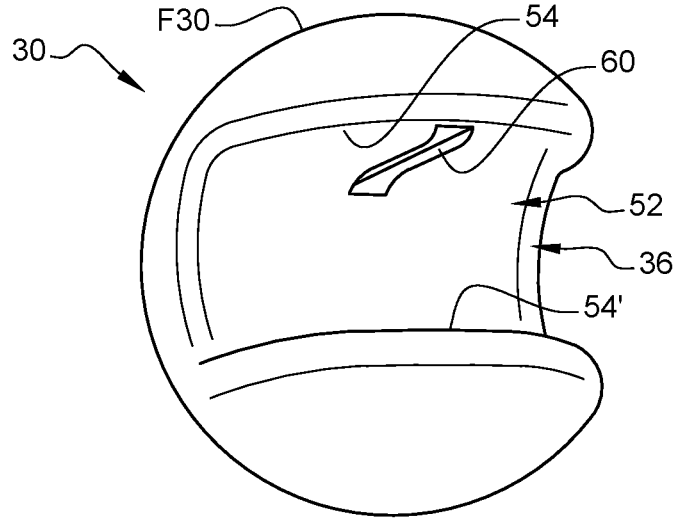
FIG. 14 is a perspective view from a second viewing angle of the spacer visible in FIG. 13.
Figure 15:
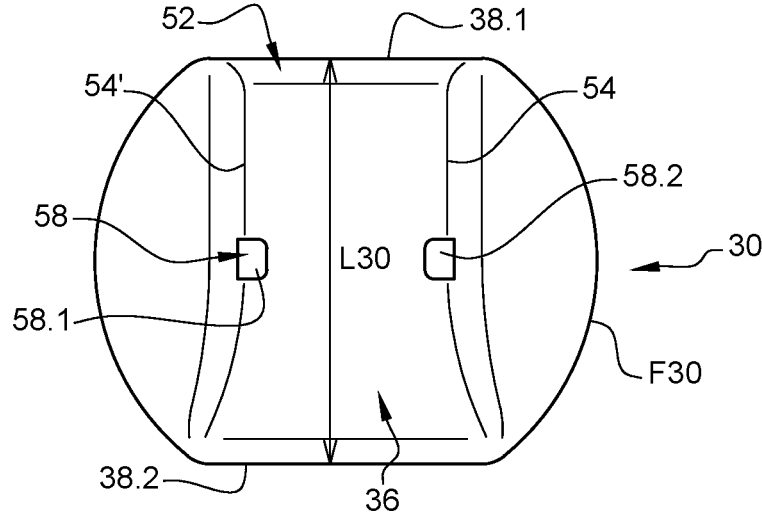
FIG. 15 is a front view of the spacer visible in FIG. 13.

According to an embodiment visible in FIGS. 13 to 15, the spacer 30 is produced in a single piece and comprises a slit 52 linking the duct 36 and the outer surface F30 to allow the electric cable 22 to be introduced into the duct 36. Thus, the duct 36 and the slit 52 form a trough. The slit 52 is delimited by lateral faces 54, 54' which extend from the duct 36 to the outer surface F30. According to this embodiment, the spacer 30 has a U-shaped or horseshoe-shaped section in a transverse plane. To hold the electric cable 22, the lateral faces 54, 54' are spaced apart by a distance slightly smaller than the diameter D22 of the electric cable 22. In addition, at least one element out of the spacer 30 and the electric cable 22 is configured to be deformed elastically in order to allow the electric cable 22 to be introduced into the duct 36 via the slit 52. The spacer 30 can be produced in a rigid or semi-rigid material such as a foam, for example.

According to one embodiment, each spacer 30 is immobilized in the longitudinal direction with respect to the electric cable 22.

According to one configuration, the spacer 30 is produced in a material exhibiting a strong coefficient of friction between the spacer 30 and the electric cable 22 to immobilize the spacer 30 with respect to the electric cable 22 by friction.

According to another configuration, the electric cable 22 comprises, for each spacer 30, at least one clamping collar 56 clamping the electric cable 22 and a part of the spacer 30 to immobilize the spacer 30 with respect to the electric cable 22.

According to a first embodiment visible in FIGS. 5 to 9, the clamping collar 56 does not protrude with respect to the outer surface F30 of the spacer 30. To this end, the spacer 30 comprises at least one passage 58 to house the clamping collar 56 which emerges via two passage orifices 58.1, 58.2 in the duct 36. The passage 58 and the passage orifices 58.1, 58.2 are dimensioned to house the clamping collar 56. The passage 58 can comprise at least one groove 60, on the outer surface F30 and/or on at least one lateral face 54, 54', dimensioned so as to house the clamping collar 56 so that it does not protrude with respect to the outer surface F30 or with respect to the lateral face 54, 54'.

According to a second embodiment visible in FIGS. 10 and 11, the clamping collar protrudes with respect to the outer surface F30. According to this second configuration, the spacer 30 comprises at least one snug 62 protruding with respect to the outer surface F30, linked thereto and positioned in proximity to one of the ends 38.1, 38.2 of the duct 36. According to this configuration, the clamping collar 56 clamps the electric cable 22 and the snug 62.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electric cable configured to be mounted in an aircraft, observing a minimum segregation distance, the electric cable comprising:
   a cylindrical outer surface which has, at a given point, an axis of revolution and a diameter,
   several spacers distributed along the electric cable, each spacer having a length and at least partially surrounding a first part of the electric cable and having an outer surface,
   the spacers being spaced apart by an interval of between 0.5 and 1 times the length, and
   each spacer being configured such that, when the outer surface is in contact with an element distinct from the electric cable or a second part of the electric cable at a distance from the first part, the latter is separated from the distinct element or from the second part by a distance greater than the minimum segregation distance.

2. The electric cable according to claim 1, wherein the outer surface of the spacer is approximately spherical.

3. The electric cable according to claim 2, wherein the spacer comprises a duct, configured to house the electric cable, which has an axis of revolution that coincides with a diameter of the spherical outer surface.

4. The electric cable according to claim 3, wherein the duct has first and second ends that are flared and a cylindrical central section of a diameter substantially equal to that of the electric cable.

5. The electric cable according to claim 3, wherein the duct has first and second ends, each comprising a rounded or chamfered edge linking the duct and the outer surface.

6. The electric cable according to claim 3,
   wherein the spacer comprises first and second hemispherical parts respectively comprising first and second contact faces, each of the first and second contact faces having a semicylindrical recess corresponding to a half of the duct, and the spacer being configured to occupy an assembled state in which the first and second contact faces are in contact with one another and a disassembled state in which the first and second contact faces are separated to allow the electric cable to be put in place in the duct.

7. The electric cable according to claim 6, wherein the spacer comprises at least one holding system for holding the first and second hemispherical parts in the assembled state.

8. The electric cable according to claim 6, wherein the spacer comprises first and second openwork parts and first and second hemispherical shells respectively covering the first and second hemispherical parts.

9. The electric cable according to claim 3, wherein the spacer is produced in a single piece and comprises a slit linking the duct and the outer surface to allow the electric cable to be introduced into the duct.

10. The electric cable according to claim 9, wherein the slit is delimited by lateral faces extending from the duct to the outer surface, said lateral faces being spaced apart by a distance slightly smaller than the diameter of the electric cable.

11. The electric cable according to claim 1, wherein the spacer is immobilized with respect to the electric cable in a longitudinal direction parallel to the axis of revolution of the electric cable.

12. An aircraft comprising at least one electric cable according to claim 1.

* * * * *